United States Patent
Weidenbruch et al.

(10) Patent No.: US 10,533,889 B2
(45) Date of Patent: Jan. 14, 2020

(54) METHOD FOR RADIOMETRIC LIMIT LEVEL MONITORING

(75) Inventors: Simon Weidenbruch, Lorrach (DE); Hartmut Damm, Teningen (DE); Mingzheng Jiang, Steinen (DE); Robert Schäuble, Herrischried (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 1406 days.

(21) Appl. No.: 13/810,234

(22) PCT Filed: Jun. 20, 2011

(86) PCT No.: PCT/EP2011/060193
§ 371 (c)(1),
(2), (4) Date: Mar. 29, 2013

(87) PCT Pub. No.: WO2012/019814
PCT Pub. Date: Feb. 16, 2012

(65) Prior Publication Data
US 2013/0204550 A1    Aug. 8, 2013

(30) Foreign Application Priority Data
Jul. 19, 2010 (DE) .................. 10 2010 031 504

(51) Int. Cl.
*G01F 25/00*    (2006.01)
(52) U.S. Cl.
CPC .................. *G01F 25/0069* (2013.01)
(58) Field of Classification Search
CPC ............ G01F 25/0069; G01F 23/2885; G01F 25/0061; G01F 23/0076; G01F 23/266; G01F 23/0069
See application file for complete search history.

(56) References Cited

U.S. PATENT DOCUMENTS

| 3,617,735 A | 2/1971 | Shoemaker |
| 5,756,876 A | 5/1998 | Wetzel |

(Continued)

FOREIGN PATENT DOCUMENTS

| DE | 1172864 | 6/1964 |
| DE | 1223574 | 8/1966 |

(Continued)

OTHER PUBLICATIONS

Ruhwirth-Schnatter, Syliva: "Data Analysis based on Finite Mixtures" "Finite Mixture and Markov Switching Models" Springer Science and Business Media, New York, XP002661178.

(Continued)

*Primary Examiner* — Mohamed Charioui
*Assistant Examiner* — Jeremy A Delozier
(74) *Attorney, Agent, or Firm* — Bacon & Thomas, PLLC

(57) ABSTRACT

A method for limit level monitoring with a radiometric limit switch. A detector measures discrete radiation intensities. Statistical distributions of radiation intensities in a state, free of medium, and in a state, covered by medium, are given by two Poisson distributions. In an interval successive radiation intensities are measured, a distribution of the radiation intensities, two separated Poisson distributions are identified within the distribution, based on the positions of the Poisson distributions identified within the distribution, an upper threshold value is determined for the radiation intensity, the exceeding of which upper threshold value by a radiation intensity measured following the interval means a state change into the state, free of medium, has been detected, and/or a lower threshold value is determined for the radiation intensity, the subceeding of which lower threshold value by a radiation intensity measured following the interval means a state change into the state, covered by medium, has been detected.

7 Claims, 3 Drawing Sheets

(56) References Cited

U.S. PATENT DOCUMENTS

2004/0128098 A1     7/2004   Neuhaus
2010/0252739 A1*   10/2010   Damm .................. G01F 23/288
                                                                                        250/357.1

FOREIGN PATENT DOCUMENTS

| DE | 19536199 A1 | 3/1997 |
| DE | 10104165 A1 | 9/2002 |

OTHER PUBLICATIONS

English translation of the International Preliminary Report on Patentability, dated Jan. 31, 2013, WIPO, Geneva,.
German Office Action, German Patent Office, dated May 3, 2011.
International Search Report, The Netherlands, dated Nov. 17, 2011.

* cited by examiner

METHOD FOR RADIOMETRIC LIMIT LEVEL MONITORING

TECHNICAL FIELD

The invention relates to a method for limit level monitoring with a radiometric limit switch having: a radiator, which sends radiometric radiation along a radiation path extending at the height of the limit level to be monitored, wherein the radiation path is located in a state free of medium, when the limit-level to be monitored is subceeded, and in a state covered by medium, when the limit-level to be monitored is exceeded; and, installed terminally in the radiation path, a detector, which measures discrete radiation intensities striking thereon dependent on the state of the radiation path, wherein, based on the measured radiation intensities, an exceeding or subceeding of the limit level is monitored.

BACKGROUND DISCUSSION

Radiometric limit switches are usually applied, when conventional limit switches are not applicable due to especially rough conditions at the measuring location. Very frequently, extremely high temperatures and pressures reign e.g. at the measuring location or chemically and/or mechanically very aggressive environmental influences are present, which make the use of other measuring methods impossible.

Radiometric limit switches are applied, for example, for monitoring an exceeding or subceeding of a predetermined fill level of a fill substance in a container. They serve the purpose, for example, of protecting against overfilling or running empty.

To this end, they involve a radioactive radiator arranged externally on the container. During operation, the radiator sends radioactive radiation along a radiation path extending at the height of the limit level to be monitored through the container. Externally on the oppositely lying side of the container, there is arranged, applied terminally in the radiation path, a detector, which quantitatively registers the radiation intensity emerging from the container. The emerging radiation intensity depends on the geometric arrangement and on absorption. The latter is dependent on the fill level of the fill substance in the container and on density.

Correspondingly, the radiation intensity has a minimum dependent on the density of the fill substance, when the fill level lies above the radiation path. Conversely, the radiation intensity has a maximum, when the fill level lies below the radiation path.

The minimum and the maximum radiation intensities are determined today regularly in a calibration method performed by the user in the context of start-up of the radioactive limit switch. In such case, the two above mentioned conditions of filling, free of medium and covered by medium, are established in the container, and the associated minimum and maximum radiation intensities are measured by the limit switch.

Based on the minimum and the maximum radiation intensities, for example, a threshold value, usually referred to as the switching point, is established for the radiation intensity. An exceeding of the threshold value corresponds to a change into the state, free of medium, and its subceeding to a change into the state, covered. In the subsequent operation of the limit switch, via a comparison of the radiation intensity measured with the threshold value, it is detected whether the limit-level to be monitored has been exceeded or subceeded. Frequently, for achieving an as flutter free as possible, stable, switching behavior, a switching hysteresis is provided. For this, based on the minimum and the maximum radiation intensities, lower and upper threshold values are established. In operation in this case, a state change into the state, free of medium, is only displayed, when the radiation intensity measured exceeds the upper threshold value, and a state change into the state, covered by medium, is only displayed, when the radiation intensity measured subceeds the lower threshold value. In between the two threshold values, the limit switch continues to show the last ascertained state. Calibration methods require today regularly the aid of the user in bringing about the required states, and the limit switch must display the presence of the respective state, in order that the associated maximum and minimum radiation intensities can be measured and stored associated with the respective states. Accompanying the calibration of the two filling conditions, free of medium, and covered with medium, is, as a rule, an interference with, interruption of and/or delay of the manufacturing- and/or processing method running at the measuring location.

SUMMARY OF THE INVENTION

It is an object of the invention to provide a method for radiometric limit level monitoring, in the case of which the limit switch assumes monitoring operation automatically, especially without preceding performance of a calibration method, in the case of which at least one of the states must be produced and the associated radiation intensity measured.

To this end, the invention resides in a method for limit level monitoring with a radiometric limit switch having a radiator, which sends radiometric radiation along a radiation path extending at the height of the limit level to be monitored, wherein the radiation path is located in a state, free of medium, when the limit-level is subceeded, and in a state, covered by medium, when the limit-level is exceeded, and installed terminally in the radiation path, a detector, which measures discrete radiation intensities striking thereon dependent on the state of the radiation path, wherein statistical distributions of radiation intensities in the state, free of medium, and in the state, covered by medium, are given by two Poisson distributions separated from one another, wherein, in an interval, in which the two states are assumed at least once, successive radiation intensities are measured, a distribution of the radiation intensities measured in the interval is plotted, two separated Poisson distributions are identified within the distribution, and, based on the positions of the Poisson distributions identified in the distribution, an upper threshold value for the radiation intensity is determined, the exceeding of which upper threshold value by a radiation intensity measured following the interval means a state change into the state, free of medium, has been detected, and/or a lower threshold value for the radiation intensity is determined, the subceedirig of which lower threshold value by a radiation intensity measured following the interval means a state change into the state, covered by medium, has been detected.

In an embodiment, the invention resides in a method, in the case of which the detector converts radiation quanta striking thereon into electrical pulses, and the discrete radiation intensities are measured in the form of pulse rates, which, in each case, correspond to the number of electrical pulses per unit time.

In a further development of the method of the invention, average values of the two Poisson distributions identified in the distribution are determined, based on the average value of the Poisson distribution centered in the distribution about a lower average radiation intensity, an average radiation intensity to be expected in the state, covered by medium, is determined, and based on the average value of the Poisson distribution centered in the distribution about a higher average radiation intensity, a radiation intensity to be expected in the state, free of medium, is determined.

In a preferred embodiment, the positions of the Poisson distributions identified in the distribution are determined, in each case, based on the associated average value of the respectively identified Poisson distribution.

In a further development, the threshold values are established based on position and variance of the two Poisson distributions identified in the distribution.

In a first variant of the invention, the interval is a length of time lying before the beginning of monitoring operation by the limit switch, the limit switch establishes the threshold values following the interval, and then enters automatically into limit level monitoring operation, in which radiation intensities are subsequently successively measured, and in which, based on the measured radiation intensities and the threshold values, the state of the radiation path is determined.

Additionally, the invention resides in a further development of the first variant, in the case of which the interval, in which successive radiation intensities are measured, is started, the distribution of the measured radiation intensities is plotted by successively entering the measured radiation intensities into the distribution, the distribution is then examined continuously or in predetermined time intervals as to whether it contains two Poisson distributions separated from one another, and the interval is terminated when two Poisson distributions separated from one another have been identified in the distribution recorded to such point in time.

Additionally, the invention resides in a method according to a second variant of the method of the invention, in the case of which there exists, lying between the Poisson distribution, which shows the statistical distribution of the radiation intensities striking the detector in the state, free of medium, and the Poisson distribution, which shows the statistical distribution of the radiation intensities striking the detector in the state, covered by medium, a prearranged, blocked region, which has exclusively radiation intensities, which can be associated neither with the state, free of medium, nor with the state, covered by medium, and the limit switch executes, during the interval, a limit level monitoring based on the radiation intensities measured in the interval, wherein an exceeding of the limit level to be monitored is detected, when an intensity measured value lies below the blocked region, and a subceeding of the limit level to be monitored is detected, when an intensity measured value lies above the blocked region.

Preferably, in the case of the second variant of the invention, in plotting the distribution, exclusively those measured radiation intensities are included into the distribution, which lie outside of the blocked region.

BRIEF DESCRIPTION OF THE DRAWINGS

The invention and other advantages will now be explained in greater detail based on the figures of the drawing showing two examples of embodiments. Equal parts are provided in the figures with equal reference characters. The figures of the drawing show as follows.

DETAILED DISCUSSION IN CONJUNCTION WITH THE DRAWINGS

Figure 1:
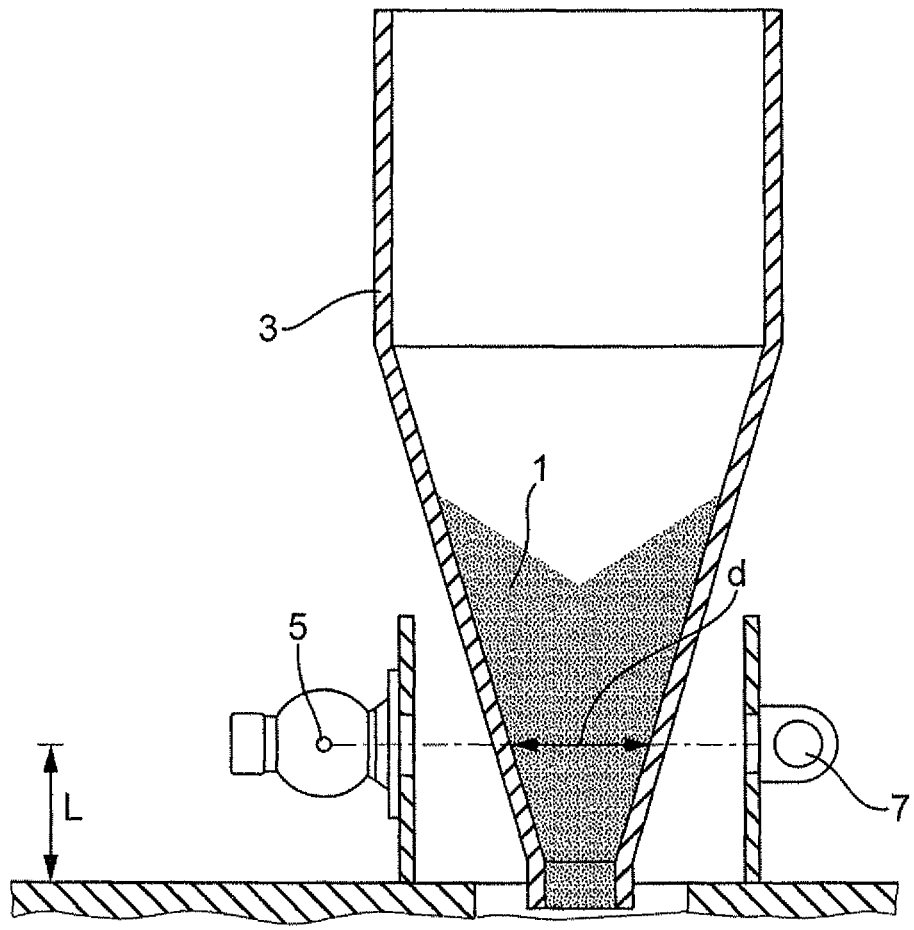
FIG. 1 is a measuring arrangement having a radiometric limit switch.

FIG. 1 shows a measuring arrangement having, mounted on a container 3 filled with a fill substance 1, a radiometric limit switch for monitoring the exceeding or subceeding of a predetermined limit level. The limit level is here a predetermined fill level L of the fill substance 1 in the container 3. The container 3 is, for example, a tank, a container, a pipe, a conveyor belt or any other form of container.

The radiometric limit switch includes a radioactive radiator 5, which sends radioactive radiation along a radiation path (shown here in the form of a dot dashed line) extending at the height of the limit level to be monitored. In the illustrated example of an embodiment, the radiator 5 is placed for this externally on the container 1 at the height of the predetermined fill level L in a radiation protection container. Radiator 5 is, for example, a gamma radiation source, such as e.g. a $Co_{60}$ or $Cs_{137}$ preparation. The invention is, however, also applicable in connection with other types of radiation sources, such as e.g. neutron radiators.

The radiation protection container has a window, through which the radiation emitted by the radiator 5 travels through the container 1 along the radiation path at the height of the limit level to be monitored.

Depending on the fill level in the container 3, there is present either a state, free of medium, wherein the fill level lies below the limit level to be monitored, or a state, covered by medium, wherein the fill level lies above the limit level to be monitored. In the state, free of medium, radiation can travel along the radiation path unimpeded in the container 3. In the state, covered by medium, the radiation path is covered in the container 3 by a medium, here the fill substance 1.

On the side of the container 3 lying opposite the radiator 5, there is provided, installed externally and terminally in the radiation path, a detector 7, which measures discrete radiation intensities $I(t_i)$ successively striking thereon, dependent on the state of the radiation path. Each intensity corresponds to a number of radiometric radiation quanta striking detector 7 per unit time $\Delta t$.

Figure 2:
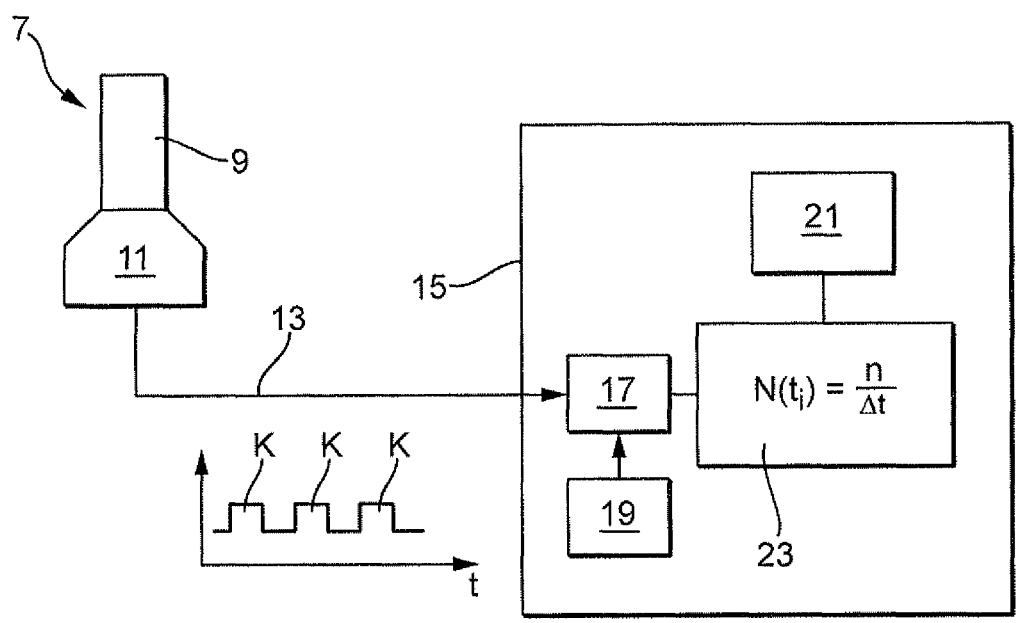
FIG. 2 is the detector of FIG. 1 and a thereto connected, measuring device electronics.

Suited as detector 7 is e.g. a scintillation detector shown in detail in FIG. 2 and having a scintillator 9, e.g. a scintillation rod, and a light receiver 11 connected thereto.

Scintillator 9 is composed of a special synthetic material, such as e.g. polystyrene (PS) or polyvinyl toluene (PVT), which is optically very pure. Under the influence of gamma radiation, flashes of light are emitted by the scintillation material. These are registered by the light receiver 11 and converted into electrical pulses K. The light receiver 11 is, for example, a photomultiplier. Alternatively, also avalanche photodiodes or semiconductor detectors, e.g. semiconductor detectors based on cadmium-zinc-telluride, can be applied. Connected to the photomultiplier 11 via a pulse transfer line 13 is a measuring device electronics 15, which, based on the entering pulses K, determines by means of a counter 17 and an internal clock 19 the pulse rate $N(t_i)$. The pulse rate $N(t_i)$ equals the number n of pulses K, which are detected per unit time $\Delta t$, and therewith is a direct measure for the radiation intensity $I(t_i)$ striking the detector 7. Pulse rate N(ti) and radiation intensity $I(t_i)$ are equivalent measured variables directly convertible into one another.

Alternatively, also other types of detectors can be applied, such as e.g. Geiger-Mueller tubes or ionization chambers, in which the striking radiation is likewise converted into light flashes, which are converted via a light receiver into an electrical signal representing the striking radiation intensity I.

The radiation intensity I striking the detector 7 depends on the radiative power of the radiator 5 and the absorption along the radiation path from the radiator 5 to the detector 7. While the absorption in the container walls is constant, the absorption along the path d traveled in the container 3 depends on the density $\rho$ and the weakening coefficient $\mu$ of the medium located in the radiation path in the container 3.

In the state, free of medium, the radiation intensity I has a maximum $I_{max}$, which is given by a starting radiative power $I_0$ representing the radiative power of the radiator 5 and the absorption in the container walls and an exponential dependence on the density $\rho_0$ of the gas, as a rule, air, located in the radiation path, the length d of the path traveled by the radiation through the gas and the weakening coefficient $\mu_0$ of the gas.

$$I_{max} = I_0 e^{-\mu_0 \rho_0 d}$$

Correspondingly, the radiation intensity I has, in the state, covered by medium, a minimum $I_{min}$, which is given by the starting radiative power $I_0$ and an exponential dependence on the density $\rho_L$ of the fill substance 1 located in the radiation path, the length d of the path traveled by the radiation through the gas and the weakening coefficient $\mu_L$ of the fill substance 1.

$$I_{min} = I_0 e^{-\mu_L \rho_L d}$$

Due to the quantum nature of the radiometric radiation, the measured radiation intensities $I(t_i)$ are discrete measured values, which occur in the two states, in each case, in a statistical distribution, which can be very well illustrated based on the statistical distribution of the measured pulse rates $N(t_i)$, i.e. the number n of the pulses K striking per unit time $\Delta t$.

If the radiation path is located in one of the two states 'free' or 'covered', then the probability p(N) for the occurrence of a certain pulse rate N is given by a Poisson distribution as follows:

$$p(N) = \frac{1}{N!}(\overline{N})^N e^{-\overline{N}},$$

wherein $\overline{N}$ in each state equals the average value of the pulse rates N arising in this state.

Figure 3:
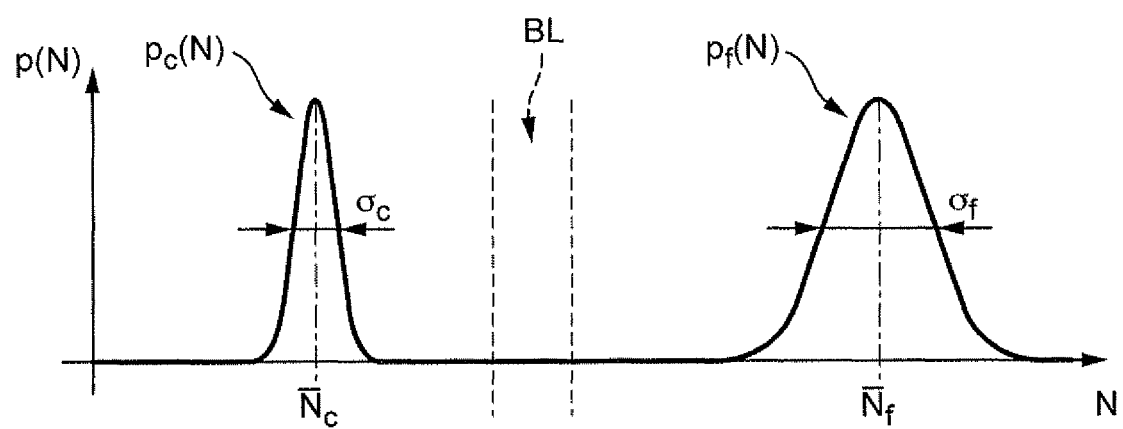
FIG. 3 is a Poisson distribution of the pulse rates resulting in the state, free of medium, and a Poisson distribution of the measured pulse rates resulting in the state, covered by medium.

FIG. 3 shows the distribution $p_f(N)$ resulting in the state, free of medium, and the distribution $p_c(N)$ resulting in the state, covered by medium. The two distributions $p_f(N)$ and $p_c(N)$ have, in each case, a marked maximum at the average value $\overline{N}_f$, $\overline{N}_c$ of the respective distributions $p_f(N)$ and $p_c(N)$. The average value $\overline{N}_f$ of the distribution $p_f(N)$ resulting in the state, free of medium, corresponds to the average radiation intensity $I_{max}$ to be expected in the state, free of medium. The average value $\overline{N}_c$ of the distribution $p_c(N)$ resulting in the state, covered by medium, corresponds to the clearly smaller average radiation intensity $I_{min}$ to be expected in the state, covered by medium.

The two distributions $p_f(N)$ and $p_c(N)$ are two clearly spaced from one another, Poissson distributions, whose widths are given by the variance $\sigma_f$, $\sigma_b$ of the respective Poisson distribution, which equals the square root of the average value $\overline{N}_f$, $\overline{N}_c$ of the respective distribution $p_f(N)$ and $p_c(N)$. Therewith it holds that:

$$\frac{\overline{N}_f}{\overline{N}_b} \geq 2^H.$$

The separation between the two Poisson distributions is given by the differently strong absorptions in the two states. The limit level monitoring with the method of the invention is, exactly as in the case of the conventional method, also only performable, when the difference in the absorption in the two states is large enough to bring about clearly distinguishable, intensity measured values. This means that the two Poisson distributions must be isolated from one another and therewith distinguishable. The minimum separation between the two Poisson distributions, which must be present, in order that the two can be seen as isolated, can be specified, for example, based on integer, half value layers H by the condition:

$$\sigma_f = \sqrt{\overline{N}_f}$$

and $$\sigma_c = \sqrt{\overline{N}_c}$$

Typically, a minimum separation of at least 5 half value layers, i.e. H=5, is required. The maintaining of this condition can, as a rule, be safely effected by estimation by the user, based on knowledge of the application.

The above said statistical properties and relationships based on Poisson distributions, due to the equivalence of radiation intensities $I(t_i)$ and pulse rates $N(t_i)$, hold naturally in equal manner also for the radiation intensities $I(t_i)$. According to the invention, these statistical properties and relationships are utilized, in order to enable an automatic entering into monitoring operation by the limit switch, especially without preceding performance of a calibration method, in the case of which at least one of the states is produced and the associated radiation intensity measured.

For this, with the detector 7, following installation of the limit switch, in an interval $T=[t_0, \ldots, t_m]$, in which the two states, free and covered, are entered at least once, successive radiation intensities $I(t_0), \ldots I(t_m)$ are measured, and a distribution D(T) of the radiation intensities $I(t_i)$ measured in the interval T plotted. In such case, it is completely insignificant, in which of the two states the radiation path is located at the beginning of the interval T. It is especially not required to cause the radiation path to enter earlier into a certain state or to know the present state.

Then, within the recorded distribution D(T), two separated Poisson distributions are identified, and, based on the positions of the Poisson distributions identified in the distribution D(T), an upper threshold value $V_{max}$ for the radiation intensity I is determined, the exceeding of which upper threshold value $V_{max}$ by a radiation intensity I measured following the interval T means a state change into the state, free of medium, has been detected, and/or a lower threshold value $V_{min}$ for the radiation intensity I is determined, the subceeding of which lower threshold value $V_{min}$ by a radiation intensity I measured following the interval T means a state change into the state, covered by medium, has been detected.

The method is naturally performable completely analogously also based on the corresponding pulse rates N. Pulse rates N and radiation intensities I are used here synonymously due to their being equivalent.

Figure 4:
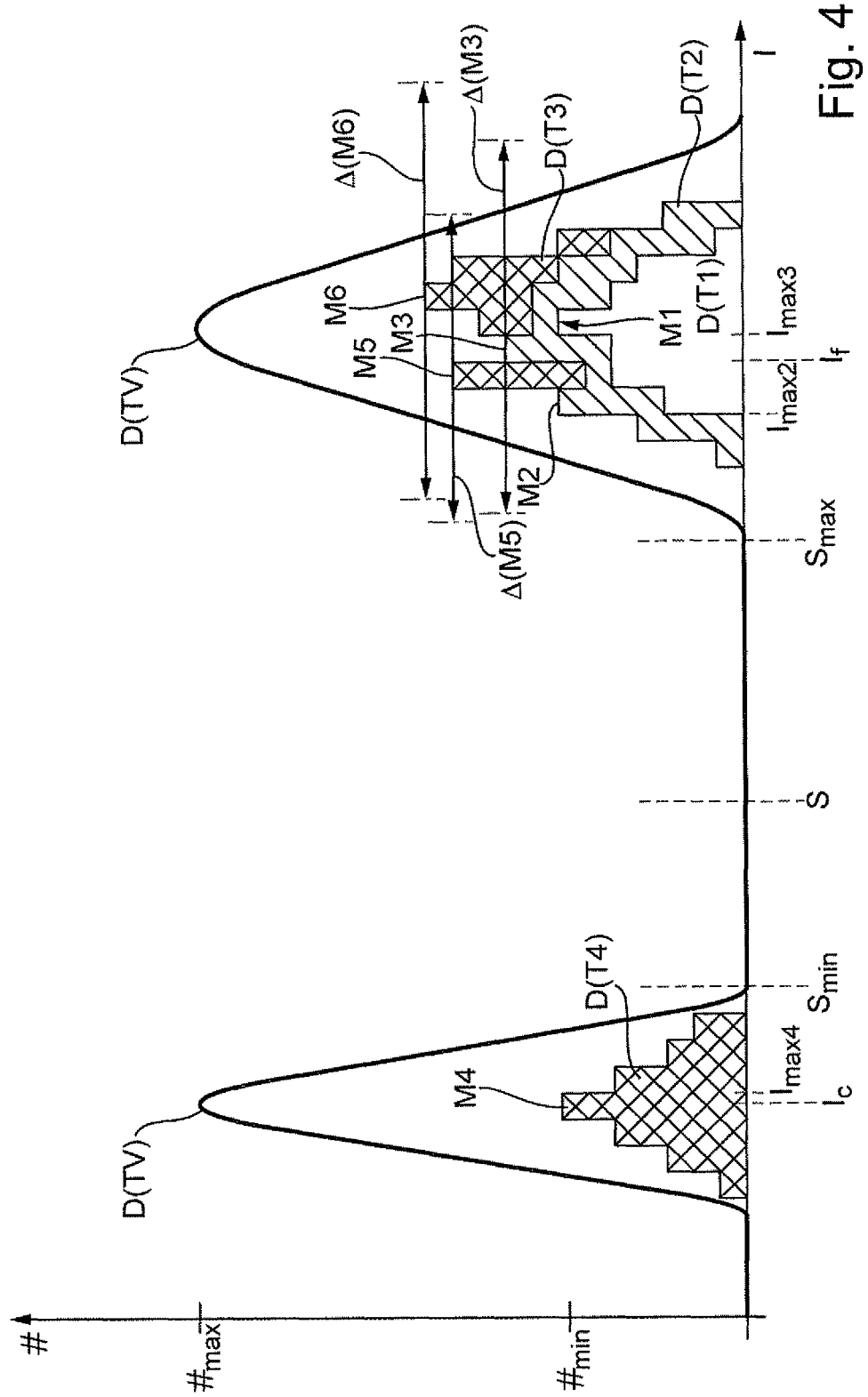
FIG. 4 is a plot of a distribution of the measured radiation intensities in a histogram.

In a first variant of the invention, the interval T is a length of time, which lies before the beginning of monitoring operation of the limit switch and in which the two states occur at least once. In the case of this variant, the limit switch begins directly after its being turned on at the point in time $t_0$ automatically to measure successive radiation intensities $I(t_i)$. The distribution D(T) of these measured radiation intensities $I(t_i)$ is plotted, for example, in the form of a histogram, in which the frequencies #, with which the individual discrete radiation intensity measured values occur, are recorded. FIG. 4 shows the development of such a histogram, in which the frequencies # are plotted as a function of the discrete measured values of radiation intensity I. This method step is performed at least until two separated Poisson distributions can be identified recorded in the distribution D(T). This happens, for example, by means of an electronic unit 23, e.g. a microprocessor, integrated in the measuring device electronics 15 and connected to a memory 21.

During this, the registered distribution D is examined by corresponding software, continuously, or, as in the example illustrated here, in predetermined time intervals T1, T2, T3 . . . , as to whether the current version of the distribution D(t) has two mutually separated Poisson distributions.

This can occur, for example, by ascertaining, in each case, the maxima M of the frequencies # of the distribution D(t) recorded to such point in time. In such case, preferably a minimum frequency $\#_{min}$ is specified, which the identified extreme values of the frequencies # must exceed, in order to be accepted as maxima M of the distribution.

In the example illustrated in FIG. 4, the radiation path was, first of all, in the state, free of medium. From the beginning of plotting at $t_0$ up to the time T1, the plotting yielded the distribution D(T1). It has a single maximum M1 exceeding the minimum frequency $\#_{min}$.

So long as the registered distribution D(t) has here only one maximum, M1, no two separated Poisson distributions can be identified, and the method step is continued.

The next snapshot shown in FIG. 4 shows the distribution D(T2) recorded up to time T2. This distribution D(T2) includes two different maxima M2 and M3 exceeding the minimum frequency $\#_{min}$.

As soon as two different maxima, here M2, M3, exceeding the minimum frequency $\#_{min}$ are present, it is checked, based on the associated radiation intensity measured values $I_{max2}$ and $I_{max3}$, whether these belong to a single Poisson distribution or to two different Poisson distributions. This happens, for example, by assuming that the two radiation intensity measured values $I_{max2}$ and $I_{max3}$ are approximately equal to average values of the associated Poisson distribution. Correspondingly, based on one of the two radiation intensity measured values $I_{max2}$ and $I_{max3}$, preferably based on the greater of the two, here $I_{max3}$, a measured value interval $\Delta(M3)$ is estimated, within which the intensity measured values associated with this Poisson distribution are to be expected. Since the variance of a Poisson distribution equals the square root of its average value, the measured value interval $\Delta(M3)$ can be estimated, for example, by an interval centered around the greater radiation intensity measured value $I_{max3}$, with an interval width to both sides of the radiation intensity measured value $I_{max3}$ being greater than or equal to twice the square root of this radiation intensity measured value $I_{max3}$.

If the intensity measured value $I_{max2}$ of the other maximum M2 of the plotted distribution lies—as shown in the distribution D(T2)—within this measured value interval $\Delta(M3)=[I_{max3}-2\ (I_{max3})^{1/2},\ I_{max3}+2\ (I_{max3})^{1/2}]$, then it is to be assumed therefrom that it is to be associated with the same Poisson distribution. On the basis of this, the limit switch detects, automatically, that the method step must be continued, since the radiation path either is still located in the starting state, or the other state has still not been present long enough to identify its Poisson distribution.

The next snapshot shown in FIG. 4 is for the distribution D(T3) recorded up to time T3. This distribution D(T3) has three different maxima M4, M5 and M6 exceeding the minimum frequency $\#_{min}$. Also here, there is a recheck, whether the maxima M4, M5, M6 can be associated with two separated Poisson distributions, wherein preferably one begins with the largest intensity measured values $I_{max6}$ and $I_{max5}$. The intensity measured value $I_{max\ 5}$ lies within the measured value interval $\Delta(M6)=[I_{max6}-2\ (I_{max6})^{1/2},\ I_{max6}+2\ (I_{max6})^{1/2}]$ around the largest intensity measured value $I_{max6}$. Correspondingly, these two maxima M5, M6 are associated with one and the same Poisson distribution.

The intensity measured value $I_{max4}$ lies outside the measured value intervals $\Delta(M6)=[I_{max6}-2\ (I_{max6})^{1/2},\ I_{max6}+2\ (I_{max6})^{1/2}]$ and $\Delta(M5)=[I_{max5}-2\ (I_{max5})^{1/2},\ I_{max5}+2\ (I_{max5})^{1/2}]$ around the two largest intensity measured values $I_{max5}$ and $I_{max6}$. Correspondingly, the limit switch now automatically identifies the presence of two separated Poisson distributions. On the basis of this, the limit switch detects that the two states of the radiation path have occurred at least once. The interval T, in which the distribution D(T) of the measured radiation intensities $I(t_i)$ is plotted, can, thus, now be terminated.

Now, for each of the two identified Poisson distributions, in each case, its position is determined. For this, preferably average values of the two identified Poisson distributions are determined, about which average values the Poisson distributions are respectively centered, and the positions are set equal to the respective average values. Then, based on the average value of the Poisson distribution centered in the distribution D(T) about a lower average radiation intensity, an average radiation intensity $I_c$ to be expected in the state, covered by medium, is determined, and, based on the average value of the Poisson distribution centered in the distribution (D(T) about a higher average radiation intensity, a radiation intensity $I_f$ to be expected in the state, free of medium, is determined.

Based on the two average values and their association with the two states of the radiation path, now an upper threshold value $V_{max}$ for the measured radiation intensities I is determined, the exceeding of which upper threshold value $V_{max}$ means a change into the state, free of medium, has been detected, and a lower threshold value $V_{min}$ is determined for the measured radiation intensities I, the subceeding of which lower threshold value $V_{min\ means}$ a change into the state, covered by medium, has been detected.

The two threshold values $V_{min}$, $V_{max}$ are established, in each case, at values lying between the two average radiation intensities $I_f$, $I_c$.

The setting of the two threshold values $V_{min}$, $V_{max}$ can, in such case, occur in equal manner as in the case of conventional limit switches, in the case of which the average radiation intensities $I_f$, $I_c$ to be expected in the states, free of medium, and covered by medium, are determined in a preceding calibration method.

Since, using average values of the two Poisson distributions, not only their positions, but, also, via their variations $\sigma(I_f)$ and $\sigma(I_c)$, each of which equals the square root of the associated average value, also their widths are known, the threshold values $V_{min}$, $V_{max}$ can now be specified optimally for the desired application.

For example, for achieving an as large as possible hysteresis, an as large as possible separation between the two threshold values $V_{min}$, $V_{max}$ can be set by placing the lower threshold value $V_{min}$ at a value, which lies directly above the Poisson distribution centered around the lower average radiation intensity $I_c$, e.g. $V_{min}=I_c+2\ \sigma(I_c)$, and by placing the upper threshold value $V_{min}$ at a value, which lies directly below the Poisson distribution centered around the higher average radiation intensity $I_f$, e.g. $V_{max}=I_f-2\ \sigma(I_f)$.

Alternatively, the upper and lower threshold values $V_{min}$, $V_{max}$ can also be placed at an equal, universal threshold value $V=V_{min}=V_{max}$ lying between the two average values.

Also, in such case, the position of this value is preferably optimally matched to the particular application. Thus, for example, in the case of limit level monitoring for preventing overfilling, a universal threshold value V can be established, which lies directly below the Poisson distribution centered around the higher average radiation intensity $I_f$, e.g. $V=I_f-2\ \sigma(I_f)$. In this way, the limit switch is able to detect and to indicate a leaving of the here desired state, free of medium, extremely early.

Correspondingly, in the case of a limit level monitoring for protection against running empty—such being the case in FIG. 1—preferably a universal threshold value V is established, which lies directly above the Poisson distribution centered around the lower average radiation intensity $I_c$, e.g. $V=I_c-2\ \sigma(I_c)$. In this way, the limit switch is also here able to detect and to indicate extremely early a leaving of the state, covered by medium, desired in this application.

The limit switch transfers now automatically into operation. In operation, successive radiation intensities I are measured, and, based on the radiation intensities I measured during operation and the threshold values $V_{min}$, $V_{max}$, the state of the radiation path is monitored.

The accuracy, with which the expected average intensity measured values $I_f$, $I_c$ in the state, free of medium, and in the state, covered by medium, and, by these, also the threshold values $V_{min}$, $V_{max}$, or V, can be determined, depends, in such case, decisively on the number of individual intensity measured values $I(t_i)$ plotted in the two Poisson distributions in the distribution D(T) relative to the bandwidth of the possible intensity measured values, and can be specified by the height of the minimum frequency $\#_{min}$. In such case, the achievable accuracy is higher, the higher the minimum frequency $\#_{min}$ is set.

A higher minimum frequency $\#_{min}$ lengthens, however, the duration of the interval T. In order, in spite of this, to be able to assume operation as rapidly as possible, consequently, also purposely, first of all, a relatively low minimum frequency $\#_{min}$ can be specified, via which, comparatively rapidly, preliminary threshold values can be ascertained, with which the limit switch can already assume operation. In that case, following on the interval T, preferably parallel to the operation based on the preliminary threshold values, a supplemental interval TS is added, in which the plotting of the distribution D(TS) of the intensity measured values $I(t_i)$ is continued, until, based on a clearly higher minimum frequency $\#_{max}$, the ultimate threshold values $V_{min}$, $V_{max}$ can be ascertained, which are then applied subsequently for further operation.

In the case of applications, where, between the Poisson distribution, which shows the statistical distribution of the radiation intensities striking the detector 7 in the state, free of medium, and the Poisson distribution, which shows the statistical distribution of the radiation intensities striking the detector 7 in the state, covered by medium, a prearranged, blocked region BL shown between dashed vertical lines in FIG. 3 is provided, which demarcates radiation intensities, which are to be associated neither with the state, free of medium, nor with the state, covered by medium, the limit switch can also perform a limit level monitoring during the interval T, based on the radiation intensities $I(t_i)$ measured in the interval T. In such case, an exceeding of the limit level to be monitored is detected, when an intensity measured value $I(t_i)$ lies below the blocked region BL, and a subceeding of the limit level to be monitored is detected, when an intensity measured value $I(t_i)$ lies above the blocked region BL.

In the case of this variant, in plotting the distribution D(T), preferably exclusively accepted into the distribution D(T) are those radiation intensities $I(t_i)$ measured in the interval T, which lie outside of the blocked region BL.

| | |
|---|---|
| 1 | fill substance |
| 3 | container |
| 5 | radioactive radiator |
| 7 | detector |
| 9 | scintillator |
| 11 | photomultiplier |
| 13 | pulse line |
| 15 | measuring device electronics |
| 17 | counter |
| 19 | clock |
| 21 | memory |
| 23 | electronic unit |

The invention claimed is:

1. A method for limit level monitoring with a radiometric limit switch, having:
   a radiator, which sends radiometric radiation along a radiation path extending at the height of the limit level to be monitored, wherein the radiation path is located in a state, free of medium, when the limit level is subceeded, and in a state, covered by medium, when the limit level is exceeded; and
   a detector installed terminally in the radiation path, which measures discrete radiation intensities striking thereon dependent on the state of the radiation path, wherein statistical distributions of radiation intensities in the state, free of medium, and in the state, covered by medium, are given by two Poisson distributions separated from one another; comprising the steps of:

measuring in an interval, in which the two states are assumed at least once, successive radiation intensities;

plotting a distribution of the radiation intensities measured in said interval;

identifying two separated Poisson distributions within said distribution;

determining an upper threshold value for the radiation intensity, based on the positions of the Poisson distributions identified in said distribution, the exceeding of which upper threshold value by a radiation intensity measured following said interval means a state change into the state, free of medium, has been detected; and/or determining a lower threshold value for the radiation intensity, the subceeding of which lower threshold value by a radiation intensity measured following said interval means a state change into the state, covered by medium, has been detected, wherein:

average values of the two Poisson distributions identified in the distribution are determined;

based on the average value of the Poisson distribution centered in the distribution about a lower average radiation intensity, an average radiation intensity to be expected in the state, covered by the medium, is determined;

based on the average value of the Poisson distribution centered in the distribution about a higher average radiation intensity, a radiaion intensity to be expected in the state, fee medium, is determined;

the interval is a length of time lying before the beginning of monitoring operation by the limit switch;

the limit switch establishes the threshold values following the interval; and then enters automatically into limit level monitoring operation in which successive radiation intensities are subsequently measured, and which, based on the meaured radiation intensities and the threshold values, the state of the radiation path is determined.

2. The method as claimed in claim 1, wherein:
said detector converts radiation quanta striking thereon into electrical pulses; and
the discrete radiation intensities are measured in the form of pulse rates, which, in each case, correspond to the number of electrical pulses per unit time.

3. The method as claimed in claim 1, wherein:
the positions of the Poisson distributions identified in the distribution are determined, in each case, based on the associated average value of the respectively identified Poisson distribution.

4. The method as claimed in claim 1, wherein:
the threshold values are established based on position and variance of the two Poisson distributions identified in the distribution.

5. The method as claimed in claim 1, wherein:
the interval, in which successive radiation intensities are measured, is started;
the distribution of the measured radiation intensities is plotted by successively entering the measured radiation intensities into the distribution;
the distribution is then examined continuously or in predetermined time intervals as to whether it contains two Poisson distributions separated from one another; and
the interval is terminated when two Poisson distributions separated from one another have been identified in the distribution recorded to such point in time.

6. The method as claimed in claim 1, wherein:
there exists, lying between the Poisson distribution, which shows the statistical distribution of the radiation intensities striking the detector in the state, free of medium, and the Poisson distribution, which shows the statistical distribution of the radiation intensities striking the detector in the state, covered by medium, a prearranged, blocked region, which has exclusively radiation intensities, which can be associated neither with the state, free of medium, nor with the state, covered by medium; and
the limit switch executes, during the interval, a limit level monitoring based on the radiation intensities measured in the interval, wherein an exceeding of the limit level to be monitored is detected, when an intensity measured value lies below the blocked region, and a subceeding of the limit level to be monitored is detected, when an intensity measured value lies above the blocked region.

7. The method as claimed in claim 6, wherein:
in plotting the distribution, exclusively those measured radiation intensities are included into the distribution, which lie outside of the blocked region.

* * * * *